Aug. 11, 1964 H. BERNSTEIN 3,144,522

VARIABLE RESISTIVITY SEAMICONDUCTOR AMPLIFIER PHONOGRAPH PICKUP

Filed July 9, 1962 3 Sheets-Sheet 1

HAROLD BERNSTEIN
INVENTOR

BY David A. Rick
Attorney

HARORLD BERNSTEIN
INVENTOR.

BY David A. Rick
Attorney

HARROLD BERNSTEIN
INVENTOR.

BY David A. Rich
Attorney

United States Patent Office 3,144,522
Patented Aug. 11, 1964

3,144,522

VARIABLE RESISTIVITY SEMICONDUCTOR AMPLIFIER PHONOGRAPH PICKUP

Harold Bernstein, Cambridge, Mass., assignor to Manlabs, Inc., Cambridge, Mass., a corporation of Massachusetts
Filed July 9, 1962, Ser. No. 208,205
15 Claims. (Cl. 179—100.41)

This invention relates to the art of converting mechanical displacements and strains into electrical signals. More particularly, the invention relates to electromechanical transducers for converting mechanical deflections and strains into amplified electrical signals. More especially, the invention relates to strain sensitive semiconductor amplifying devices utilizing the large piezoresistance effect of a semiconductor single crystal as a sensing element. The term "single crystal' medium as used herein means a solid material having an ordered arrangement of atoms or molecules. The terms mechanical deflection and displacement, as used herein, include, but are not limited to, strain producing mechanical forces.

In the prior art, various devices have been proposed for converting mechanical displacements into an electrical signal. The semiconductor and wire strain gauge elements exhibit a variable resistivity in response to a deformation of the element. In Patent No. 2,939,317 issued to W. P. Mason on June 7, 1960, there are disclosed variable resistance semiconductive devices. These devices are based on the so-called piezoresistive effect in semiconductive material, such as germanium and silicon. The devices of the character disclosed in Mason are more sensitive to mechanical deflection or strain than, for example, equivalent wire strain gauges.

The output electric signals of wire and semiconductor strain gauge elements are insufficient for many applications. In contrast with the above, the transducer of the present invention provides a greatly magnified output signal while retaining its linearity.

In Patent No. 2,497,770 issued to R. L. Hanson for a Transistor-Microphone, on February 14, 1950, an apparatus is disclosed for translating mechanical vibration into amplified electrical vibrations or signals. Hanson uses a semiconductor amplifier of a point contact variety. His device, however, is based on the principle of variable resistance of a point contact. In contrast, the present invention uses the piezoresistive effect of a semiconductor transducer element. In Hanson, electrical characteristics are effected by a mechanical alteration of the contact resistance between one of the electrodes, for example, the emitter and the body of a semiconductor block. The mechanical alteration of the contact comprises a change in the contact pressure or area or a change in the location of the contact as by sliding, rocking or rolling a suitably shaped electrode over a semiconductor surface.

In a particular application, the contact alteration may be derived from a microphone diaphragm, a phonograph needle or other vibration-responsive device. In the Hanson device, multiple point contacts are used against a semiconductor block freely supported between fixed stationary point contact electrodes which bear against one face of the block. Other point contact electrodes are mounted on and movable with a vibration-responsive diaphragm. He uses carbon granules as multiple point contact electrodes. Motion of the diaphragm presses the movable electrodes against the face of the semiconductor block. Such a device is noisy. It is subject to the conventional noise associated with carbon pile transducers. In addition, the output suffers from non-linearities associated with variable point contact resistance.

In contrast, the present invention provides a linear output signal relative to the initiating mechanical displacement or strain at an exceedingly low noise level.

The present invention is distinguishable from Hanson in that he uses the variable resistivity of current through a carbon pile and then amplifies that variation through a transistor. He does not in the sense of the present invention deform a single crystal base element to provide amplification by varying the gain of a transistor mechanically.

The Hanson device is presented as an improvement over No. 2,549,550 of Wallace. The Wallace device is distinguishable from the present invention in that it utilizes a point contact type of transistor as opposed to a surface contact junction transistor. In the present invention the resistivity of the entire base element is varied by deforming it. In contrast, Wallace varies the area of contact between the emitter and the base to vary the surface contact resistance. This mechanism is entirely different from that employed in the present invention.

Patent No. 2,558,563, Janssen, shows a piezoelectric strain gauge in which the gauge is permanently mounted on a deformable membrane. In Patent No. 2,939,317, Mason, a piezoresistive strain gauge element is shown and illustrated. There is no suggestion in Mason or Janssen, however, of varying the resistivity of a base element of a transistor to provide a variation in gain.

It is, therefore, an object of the invention to provide an improved electromechanical transducer for converting mechanical energy into electric current.

A further object of the invention is to provide an improved sound conversion apparatus for converting sound energy into an alternating electric current.

Yet another object of the invention is to provide an improved phonograph pickup device for producing an alternating electric current representative of sound signals.

Still another object of the invention is to provide an improved electromechanical transducer for converting mechanical energy into electric energy with an improved signal to noise ratio.

Yet another object of the invention is to provide an improved electromechanical transducer for converting a mechanical signal into a relatively large electric signal.

Another object of the invention is to provide an improved electromechanical transducer for converting mechanical energy into electric energy adapted to remote control of strain sensitivity.

Still another object of the invention is to provide an improved electromechanical transducer exhibiting relatively high stain sensitivity.

Still another object of the invention is to provide an improved electromechanical transducer compatible with transistor circuitry.

In accordance with the invention, there is provided an electromechanical transducer for converting mechanical energy into an electric current. Deformable transducer means are provided. The transducer means include a transducer element formed of a single crystal of electrically semiconductive material for varying the resistivity of the element in response to a mechanical deflection. Rectifying junction means are coupled to the element for producing an amplified electric signal.

In one form of the invention sound conversion apparatus is provided for converting sound energy into alternating electric current. Engagement means are provided for engaging a source of sound vibrations. Vibration means are provided and include a vibration member coupled to the engagement means for vibrating in accordance with the sound vibrations. Deformable transducer means are disposed on the member. The transducer means include a transducer element formed of a single crystal of electrically semiconductive material for varying the resistivity of the element in response to vibrations of the member. Rectifying junction electrode means are coupled to the element for producing an amplified electric signal.

In another form of the invention, a phonograph pickup device is provided for producing an alternating electric current representative of sound signals. The device includes a stylus means for engaging a moving phonograph record impressed in accordance with sound vibrations. Mechanical vibration means are provided and include a vibration member coupled to the stylus means for vibrating in accordance with the sound vibrations. Deformable transducer means are disposed on the member. The transducer means include a transducer element formed of a single crystal of electrically semiconductive material for varying the resistivity of the element in response to vibrations of the member. Rectifying junction electrode means are coupled to the element for producing an amplified electric signal.

For a better understanding the present invention, together with other and further objects thereof, reference is made to the following description taken in connection with the accompanying drawings and its scope will be pointed out in the appended claims.

*Principles of Operation*

Figure 1:
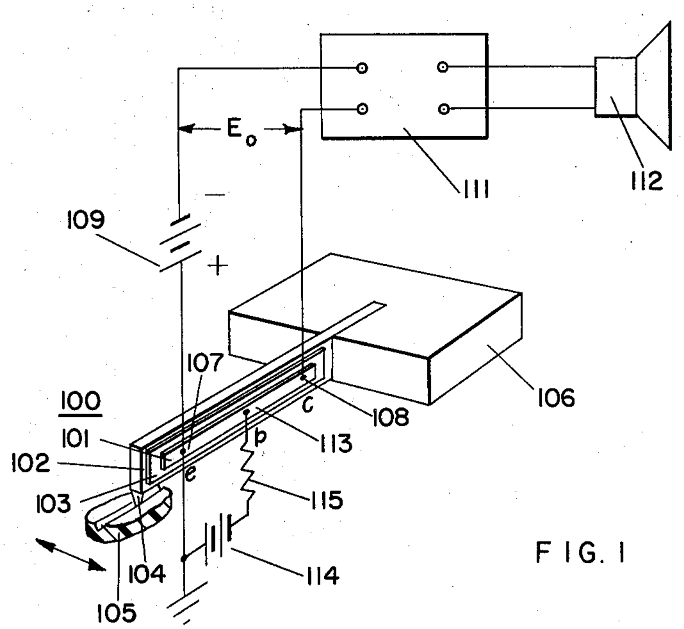
FIG. 1 is a schematic circuit diagram of a phonograph system including a perspective view of a phonograph pickup device embodying the invention.

In my co-pending application entitled Semiconductor Phonograph Pickup Device, filed on June 26, 1961, Serial No. 119,356, a phonograph pickup embodying a two terminal semiconductor strain element is disclosed and claimed. In the present invention the concept has been extended to include a three terminal, strain sensitive, semiconductor junction device, or strain transistor.

The current gain of a junction transistor is familiarly termed $\beta$ which is the ratio of output collector current $I_c$ to an input base current $I_b$. The current gain or $\beta$ depends upon the physical parameters of the semiconductor layers forming the junction transistor and the geometry of the junctions. More particularly, $\beta$ is a function of the resistivity $\rho_B$. A variation in the base resistivity immediately affects the current gain $\beta$. If the base current $I_b$ is fixed, the collector current $I_c$ varies in proportion to the change in $\beta$. Thus, a change in $I_c$ for a fixed $I_b$ produces an amplified signal representative of the change in resistivity of the base. A deformable transistor may then be coupled to a stressed mechanical member to produce a varying physical strain $e$. In accordance with the piezoresistive effect for the semiconductor base the change in base resistivity is characterized by:

Equation 1

$$\frac{\Delta\rho_b}{\rho_b}=K_b e$$

where $K_b$ is a piezoresistive coefficient for the base material, and is determined by the resistivity type and magnitude and the relative crystallagraphic orientation of the single crystal base layer.

Now $\beta$ can be written:

Equation 2

$$\beta=\frac{1}{\frac{C_1}{\rho_b}+C_2}$$

where $C_1$, $C_2$ are constants determined by the structure and materials used for a suitable transistor design and derived in accordance with well-known transistor design principles.

Then for a change $\Delta\beta$:

Equation 3

$$\Delta\beta=\frac{C_1\Delta\rho_b}{(C_1+C_2\rho_b)^2}=\frac{C_1}{\rho_b}\beta^2\frac{\Delta\rho_b}{\rho_b}$$

which becomes approximately:

Equation 4

$$\Delta\beta\approx\beta\frac{\Delta\rho_b}{\rho_b}=\beta K_b e$$

Furthermore, since

Equation 5

$$I_c=\beta I_b$$

then a change in collector current $\Delta I_c$ is:

Equation 6

$$\Delta I_c=\Delta\beta I_b=(I_c K_b)e$$

The above analysis indicates that the relative change in output current $$\frac{\Delta I_c}{I_c}$$

is proportional to the strain $e$. Thus, a strain sensitive transistor of this character produces an output current which varies in proportion to a properly applied mechanical deformation. The coefficient $K_b$ for germanium and silicon is a large number, of the order of 100, when the base region crystal has the proper orientation. Because of the strain sensitivity of the base material, i.e., the relatively large change in resistivity which accompanies mechanical deformation, the apparent strain sensitivity of the device is substantially increased with respect to prior art devices. The strain sensitivity of a wire strain gauge, for example, may be of the order of 3 or 4. The strain sensitivity of a strain transistor embodying the present invention may be of the order of 100 and much higher.

It is to be noted that the effective change in resistivity for a strain gauge element takes place along an elongated axis parallel to the strain directions. In the present invention the base material may be a relatively thin disk. The resistivity change transverse to the plane of the disk electrically has a greater effect on the strain transistor operation. The collector current $I_c$ tends to flow transverse to the plane of the disk. In the form of the invention utilizing an elongated, for example, rectangular strip of material, longitudinal strain of the strip produces a change in resistivity transversely to the plane of the strip as well as along the longitudinal axis.

While the remarks and description below are particularly directed to bipolar transistors, the invention has application as well to unipolar or so-called field effect transistors.

*Description of Strain Transistor Geometry*

A strain transistor used in accordance with the invention may be a small, flat, disk-shaped device fabricated of single crystal silicon with junctions formed by solid state diffusion techniques. The entire device may be one thin slab of single crystal as distinguished from an alloyed junction device consisting of both single crystal silicon or germanium and alloyed metallic contacts. The diffused junction single slab geometry appears to be preferable to the alloyed junction construction. The former construction enables the entire transistor body to respond uniformly and reproducibly to a lateral strain. In contrast, alloyed junction construction tends to introduce differential deformation between the semiconductor and metallic parts. Here, it is desirable to transmit a mechanical deformation to the base region of the transistor via the collector region, which is bonded directly to the deformable mechanical member being measured. Hence a transistor with plane parallel junction geometry in which the collector and base are plane parallel regions of the same crystal tends to respond to a mechanical deformation in the manner desired.

*Description and Explanation of the Phonograph System in FIG. 1*

Referring now to the drawings and with particular reference to FIG. 1, there is here illustrated a phonograph system embodying the invention. The phonograph system includes sound conversion apparatus for converting sound energy into an alternating electric current. The phonograph pickup is generally indicated at 100.

Deformable transducer means, including a transducer element 101, are disposed on a vibration means including a mechanically vibrating member 102. The element 101 provides the base of a junction transistor and is formed, for example, of a single crystal of semiconductive material such as P-type (1, 0, 0) oriented silicon or N-type (1, 1, 1) oriented germanium in a direction normal to the plane of the base.

The element 101 is insulated from the member 102 by a sheet or panel 103 or by an adhesive. The member 102 has fixed at an end an engagement means such as the stylus 104 for engaging the groove of a conventional record disk 105. As shown in FIG. 1, the sound conversion apparatus is particularly represented for use with a lateral cut record groove. This implies that the stylus 104 extends from the member 102 perpendicularly to and coplanar with the member 102, which is preferably rectilinear in shape. An end of the member 104 is rapidly affixed to the base 106. The apparent vibratory motion of the member 102 is produced by virtue of the member being cantilevered relative to the base 106. Mechanical vibrations are set up in member 102 by lateral deflections of the stylus 104. The element 101, in contrast with the copending application cited above, is coupled through rectifying junctions to provide a bipolar transistor. In particular, the emitter 107 and collector 108 are coupled to a source of power 109 and an output amplifier 111 which in turn is coupled to a speaker 112. The base connection 113 is coupled to a bias supply 114 and resistor 115. The bias supply is a constant current generator and provides a constant base current for the transistor.

Figure 2:
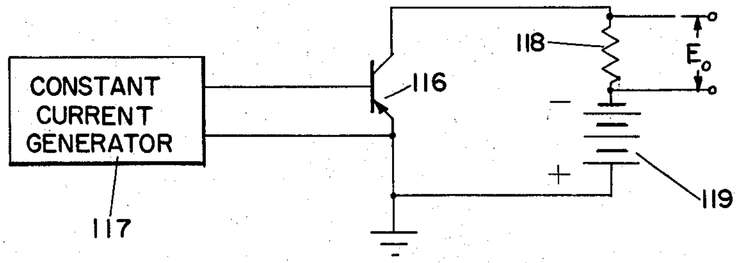
FIG. 2 is a schematic diagram illustrating the device as used in an electrical circuit.

*Description and Explanation of the Circuit in FIG. 2*

Referring now to FIG. 2, there is here illustrated a constant current generator circuit embodying the present invention. Here, a grounded emitter strain transistor 116 is shown with its base circuit connected to a constant current generator 117. The collector is connected in series with a load impedance 118 and voltage source 119. The output voltage is taken across the impedance 118. Since the base bias current is held constant, variations in the $\beta$ of the strain transistor due to its deflection produce amplified variations in current through the load impedance 118.

For typical circuits, the voltage source 119 may be 10–12 volts, the impedance 118 may be 100–1000 ohms and the transistor collector current $I_c$ may vary as much as 50% depending upon the application.

Figure 3:
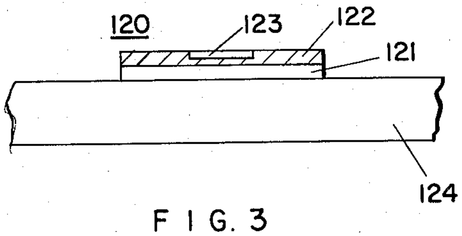
FIG. 3 is a fragmentary sectional view of a strain transistor used in accordance with the invention.
Figure 4:
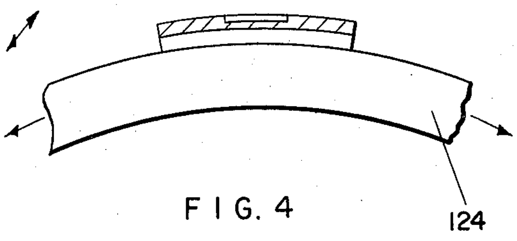
FIG. 4 illustrates the strain state of the device in FIG. 3.

*Description and Explanation of the Device Illustrated in FIGS. 3 and 4*

Here a strain transistor generally indicated at 120 is shown mounted on a mechanical member 124 in an unstrained state. Mounted on the mechanical member is the transistor collector 121 formed of a piezoresistive, strain sensitive, single crystal material. Superimposed on the collector is the base 122. Centrally formed in the base 122 is the emitter 123. Here the transistor is bipolar with rectifying junctions between the collector and the base and the emitter and the base.

As shown in FIG. 2, the resistivity of the base may be characterized:

Equation 7

$$\rho_b=\rho_0$$

where $\rho_0$ is the steady state resistivity. The amplification factor may be characterized:

Equation 8

$$\beta=\beta_0$$

where $\beta_0$ is the steady state current gain.

In FIG. 4, the member 124 is shown in the strained state and the transistor in a state of tension. In this condition:

Equation 9

$$\rho_b=\rho_0+\Delta\rho$$

and

Equation 10

$$\beta=\beta_0+\Delta\beta$$

where $\Delta\rho$ is the incremental resistivity and $\Delta\beta$ is the incremental current gain.

Figure 5:
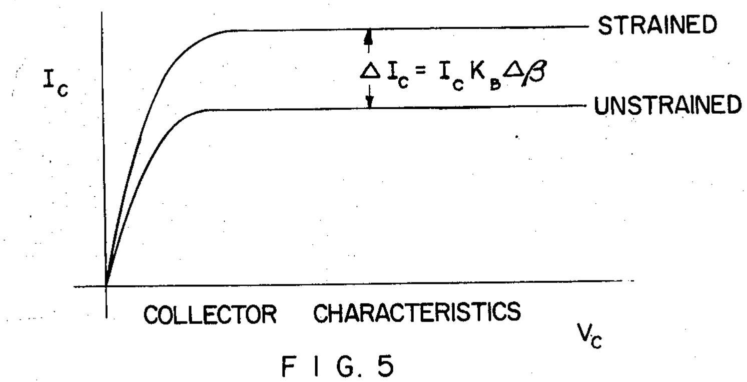
FIG. 5 is a curve illustrating the collector characteristics of a transistor embodying the invention.

In FIG. 5, the relationship between collector current $I_c$ and collector voltage $V_c$ is graphically illustrated for the strained and unstrained states. The incremental current may be characterized as follows:

Equation 11

$$\Delta I_c=I_cK_b\Delta\beta$$

where $I_c$ is the steady state collector current, $\Delta I_c$ is the incremental collector current, $\Delta\beta$ is the incremental current gain and $K_b$ is a constant as defined above.

Figure 6:
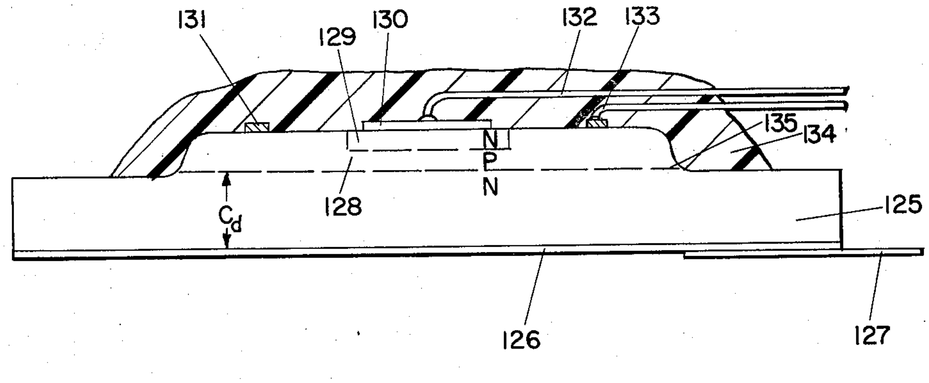
FIG. 6 is a side elevational view of a transistor embodying the invention.
Figure 7:
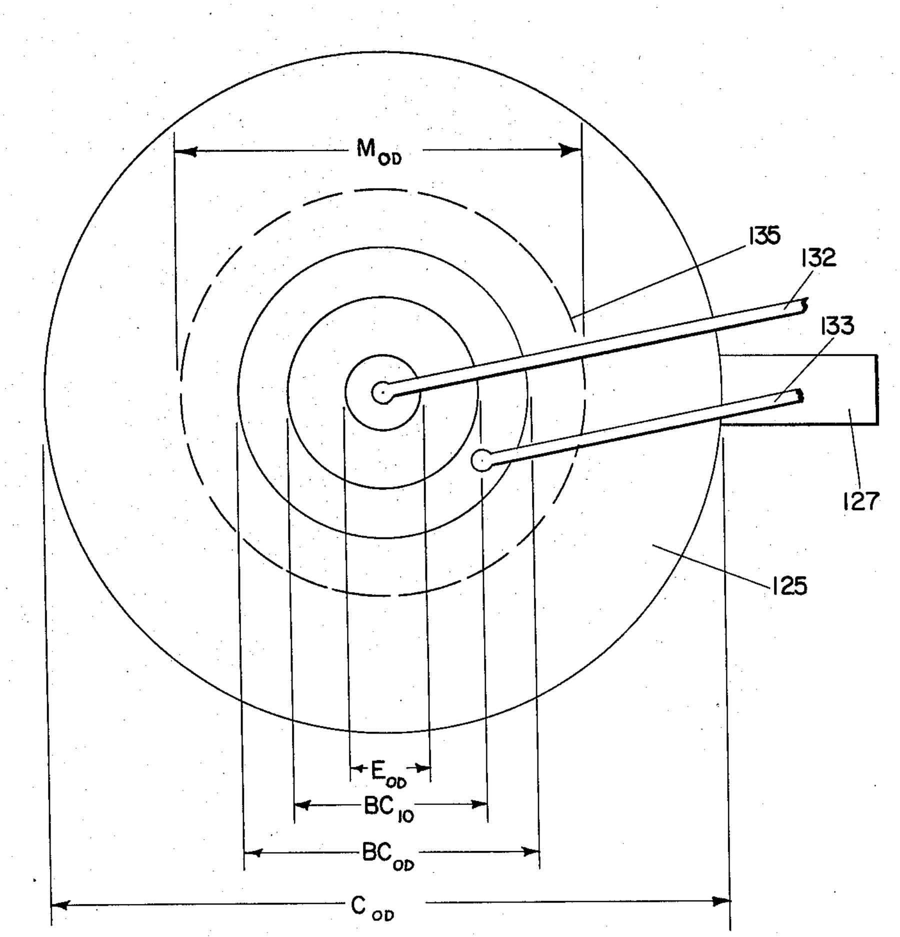
FIG. 7 is a plan view of the transistor in FIG. 6.
Figure 8:
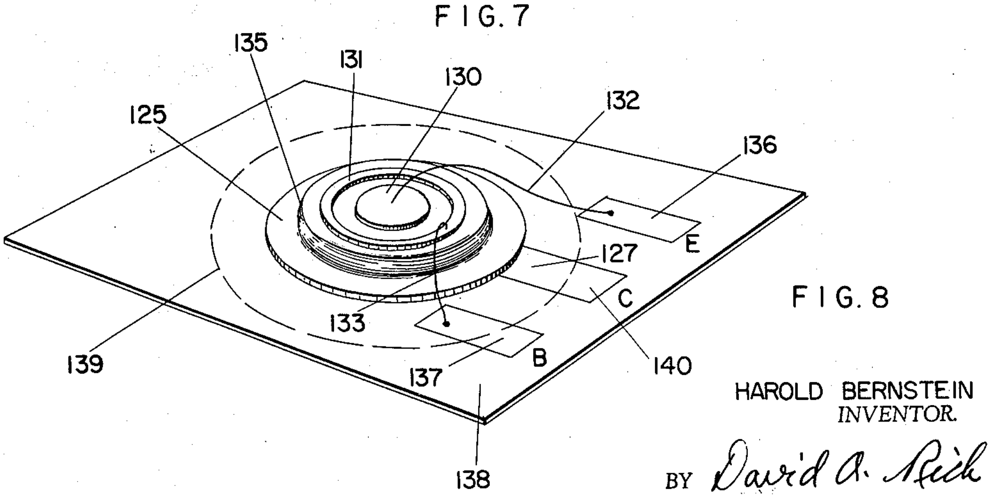
FIG. 8 is a perspective view illustrating the mounting of the transistor in FIG. 6.

*Description and Explanation of the Strain Transistor in FIGS. 6, 7 and 8*

Referring now to FIGS. 6, 7 and 8, with particular reference to FIG. 6, a side elevational view of an NPN strain transistor embodying the present invention is shown.

The so-called "mesa" diffused silicon transistor may be fabricated by diffusion techniques which are well known. This transistor type appears appropriate for use in the present invention. A transistor body having circular symmetry may be used in the form of a thin disk, e.g., .003" thick by .250" in diameter. The disk may be a single crystal wafer etched to size and cut from .001 ohm-cm. N-type crystal to form a collector. An epitaxial layer of about 1 ohm-cm. (P-type) silicon may then be deposited on one side of the wafer to a thickness of about .0005 inch to provide a base region. An emitter region may be diffused into the epitaxial layer to a depth of about .00025 inch by diffusing an N-type impurity such as phosphorous from the vapor phase through an oxide mask. Emitter and base contacts may be evaporated metallic films in the form of a central dot and ring as shown. These may be microalloyed into the silicon to form low resistance contacts. A nickel plate may be electrolytically deposited on the opposite side of the collector wafer and a thin metallic ribbon attached to form a collector contact. The mesa is formed by chemically etching away excess material and exposing the collector junction. After attaching leads by either soldering or thermocompression bonding, the transistor wafer may be mounted either directly to the deformable member or indirectly via a layer of paper of the type used in conventional strain gauges. A thin metallic membrane of the order of .002 inch may be used in place of the paper and provide both an electrical contact to the collector and a heat sink for electrical power dissipated in the collector junction. A potting compound of a flexible plastic may be used to protect the sensitive semiconductor surfaces in the immediate vicinity of the emitter and collector junctions and also to provide mechanical support.

Thus, in the embodiment illustrated the collector 125 is formed of single crystal silicon preferably of (1,0,0) orientation. A layer of nickel 126 is electrolytically plated on the underside as shown to provide a contact. Soldered to the nickel contact is a collector contact tab 127. The collector may be formed, e.g. from N-type silicon. The region of the base 128 is indicated by the dashed lines which illustrate the base-collector and the base-emitter junctions. The base region may be formed from P doped silicon by epitaxial growth from the vapor phase. The emitter region 129 may be formed from N+ doped silicon formed by diffusing phosphorous from the vapor phase. There is thus provided an NPN transistor with diffused collector-base and emitter base junctions at the dotted lines. A gold-antimony contact 130 may be formed by evaporation on the emitter. A base ring contact 131 formed, e.g. of aluminum by evaporation on the base, surrounds the emitter-contact. A pair of connection wires 132 and 133, e.g. formed of nickel coated copper, are connected ohmically, e.g. by soldering, to the emitter and base contacts respectively. To protect the emitter and base connections, the upper surface, as shown, is encapsulated with a flexible plastic potting compound 134. Typical dimensions of the transistor elements in depth along the current path may be:

| | Inches |
|---|---|
| Collector $C_d$ | .003 |
| Base $B_d$ | .00025 |
| Emitter $E_d$ | .00025 |

As shown in the plan view of FIG. 7, the diameters of the elements may be as follows:

| | Inches |
|---|---|
| Collector OD ($C_{OD}$) | .250 |
| Mesa region ($M_{OD}$) | .200 |
| Base contact OD ($BC_{OD}$) | .120 |
| Base contact ID ($BC_{ID}$) | .060 |
| Emitter contact OD ($EC_{OD}$) | .030 |

A mounting arrangement for the transistor is shown in perspective in FIG. 8. The transistor may be mounted, for example, on bonding paper by forming evaporated, metal, soldered terminals 136 and 137 and 140 for the emitter, the base and collector connections respectively. The encapsulation of the transistor on the paper 138 is shown in outline by the dashed line 139.

It will be apparent from the foregoing description that the novel phonograph pickup and strain transistor of the present invention has broad application for producing an output electrical signal in response to a mechanical deflection. Thus, the principles of the present invention are useful wherever a transducer is required, and particularly where high sensitivity and amplification are important.

While there has hereinbefore been described what are at present considered to be preferred embodiments of the invention, it will be apparent to those of ordinary skill in the art that many and various changes and modifications may be made with respect to the embodiments described and illustrated without departing from the spirit of the invention. It will be understood, therefore, that all such changes and modifications as fall fairly within the scope of the present invention, as defined in the appended claims, are to be considered as a part of the present invention.

What is claimed is:

1. A phonograph pickup device for producing an alternating electric current representative of sound signals, comprising:

stylus means for engaging a moving phonograph record impressed in accordance with sound vibrations;

mechanical vibration means including a vibration member coupled to said stylus means for vibrating in accordance with said sound vibrations;

deformable transducer means disposed on said member including a transducer element formed of a single crystal of electrically semiconductive material for varying the resistivity of the element in response to vibrations of said member; and rectifying junction electrode means coupled to said element for producing an amplified electric signal.

2. Sound conversion apparatus for converting sound energy into an alternating electric current, comprising:

engagement means for engaging a source of sound vibrations;

vibration means including a vibration member coupled to said engagement means for vibrating in accordance with said sound vibrations;

deformable transducer means disposed on said member and including a transducer element formed of a single crystal of electrically semiconductive material, for varying the resistivity of said element in response to vibrations of said member; and rectifying junction electrode means coupled to said element for producing an amplified electric signal.

3. A strain sensitive semiconductor transistor device, comprising:

a deformable base formed of piezoresistive, semi-conductive material, said base being adapted to flex in response to a mechanical displacement;

an emitter rectifying junction coupled to said base; and a collector rectifying junction coupled to said base to provide, in combination, a transistor adapted to vary its current gain characteristic in proportion to the variation in resistivity of said base in response to said mechanical displacement.

4. A strain sensitive semiconductor transistor device, comprising:

a deformable base formed of piezoresistive, single crystal, semiconductive material, said base being adapted to flex in response to a mechanical displacement;

an emitter rectifying junction coupled to said base; and a collector rectifying junction coupled to said base to provide, in combination, a transistor adapted to vary its current gain characteristic in proportion to the variation in resistivity of said base in response to said mechanical displacement.

5. A strain sensitive semiconductor device, comprising:

a deformable base formed of a disc of piezoresistive, semiconductive material, said base being adapted to flex in response to a mechanical displacement;

an emitter rectifying junction coupled to said base; and a collector rectifying junction coupled to said base to provide, in combination, a transistor adapted to vary its current gain characteristic in proportion to the variation in resistivity of said base in response to said mechanical displacement.

6. A strain sensitive semiconductor device, comprising:

a deformable base formed of a disc of piezoresistive, single crystal, semiconductive material, said base being adapted to flex in response to a mechanical displacement;

an emitter rectifying junction coupled to said base; and a collector rectifying junction coupled to said base to provide, in combination, a transistor adapted to vary its current gain characteristic in proportion to the variation in resistivity of said base in response to said mechanical displacement.

7. A strain sensitive semiconductor device, comprising:

a deformable, plane-defining base formed of piezoresistive, single crystal, semiconductive material, the crystallographic orientation of said material being so chosen as to provide maximum piezoresistivity along an axis perpendicular to the plane of said base, said base being adapted to flex in response to a mechanical displacement;

an emitter rectifying junction coupled to said base; and a collector rectifying junction coupled to said base to provide, in combination, a transistor adapted to vary its current gain characteristic in proportion to the variation in resistivity of said base in response to said mechanical displacement.

8. Electromechanical transducer for converting mechanical energy into an electric current, comprising:
deformable transducer means, including a transducer element formed of a single crystal of electrically semiconductive material for varying the resistivity of said element in response to a mechanical deflection; and
rectifying junction electrode means coupled to said element for producing an amplified electric signal.

9. Electromechanical transducer for converting mechanical energy into an electric current, comprising:
deformable transducer means, including a transducer element formed of a single crystal of electrically semiconductive material for varying the resistivity of said element in response to a mechanical deflection;
rectifying junction electrode means coupled to said element for producing an amplifying electric signal; and
mechanical vibration means including a vibration member coupled to said element for vibrating in response to a mechanical deflection.

10. Electromechanical transducer for converting mechanical energy into an electric current, comprising:
deformable transducer means, including a transducer element formed of a single crystal of electrically semiconductive material for varying the resistivity of said element in response to a mechanical deflection;
collector rectifying junction means coupled to said element; and
emitter rectifying junction means coupled to said element for producing, in combination, an amplified electric signal.

11. The electromechanical transducer of claim 8, wherein:
said transducer element is strain-responsive and said rectifying junction electrode means include a collector layer having a first conductivity type, said transducer element being an epitaxially formed base layer in rectifying junction with said collector layer, said base layer being of a second conductivity type characterized by a polarity opposite the polarity of said first conductivity type, and an emitter region of said first conductivity type is diffused into rectifying junction with said base layer; and
metallic electrodes are deposited on said collector, base and emitter to provide output connections for said electromechanical transducer.

12. The electromechanical transducer of claim 11, wherein:
said transducer element has circular symmetry and is formed of silicon, said collector layer being circular, said base layer forming an upraised circular mesa region concentric with said collector layer, said collector layer extending radially beyond said base layer, and said electrodes being circular and concentric.

13. The electromechanical transducer of claim 10, wherein:
said transducer includes control current means coupled to said element and said emitter means for providing a selected base control current, collector current means coupled between said emitter and said collector means for producing a collector current, and load means coupled in series with said collector junction means and said collector current means for developing said amplified electric signal.

14. The electromechanical transducer of claim 13, wherein:
said control current means is adapted to provide a substantially, unidirectional base bias current, said collector current is unidirectional, and said load means is resistive.

15. The electromechanical transducer of claim 10, wherein:
said transducer includes vibration means adapted to receive sound vibrations and having a vibration membrane member for vibrating in accordance with said sound vibrations, said deformable transducer means being disposed on said membrane member to provide, in combination, sound conversion apparatus including a strain-sensitive transistor adapted to vary its current gain characteristic in proportion to the variation in resistivity of said base element in response to said sound vibrations.

No references cited.